(12) United States Patent
Smith

(10) Patent No.: US 9,445,584 B2
(45) Date of Patent: Sep. 20, 2016

(54) CLAMPING ASSEMBLY FOR SECTIONED FISHING ROD

(71) Applicant: Robert Smith, Matthews, NC (US)

(72) Inventor: Robert Smith, Matthews, NC (US)

(*) Notice: Subject to any disclaimer, the term of this patent is extended or adjusted under 35 U.S.C. 154(b) by 135 days.

(21) Appl. No.: 14/487,760

(22) Filed: Sep. 16, 2014

(65) Prior Publication Data

US 2016/0073618 A1    Mar. 17, 2016

(51) Int. Cl.
*B25G 3/36* (2006.01)
*E04B 1/26* (2006.01)
*E04G 7/00* (2006.01)
*A01K 87/02* (2006.01)
*F16B 2/10* (2006.01)

(52) U.S. Cl.
CPC ............... *A01K 87/02* (2013.01); *F16B 2/10* (2013.01); *Y10T 403/71* (2015.01)

(58) Field of Classification Search
CPC ...... A01K 87/02; A01K 87/04; A01K 97/00; A01K 97/08; A01K 99/00; F16B 2/10; F16B 2/00; F16B 2/20; Y10T 403/71; Y10T 403/7105; Y10T 403/7129; Y10T 403/7141; Y10T 403/7171; Y10T 403/7176; Y10T 403/7188; Y10T 16/31; Y10T 16/534; Y10T 24/1471; Y10T 24/3431; A47K 10/14; F16M 13/00; A47G 29/08; A47G 25/12

USPC ............ 403/322.4, 384, 385, 389, 391, 396, 403/399; 43/24, 25, 25.2
See application file for complete search history.

(56) References Cited

U.S. PATENT DOCUMENTS

| | | | | |
|---|---|---|---|---|
| 1,844,044 A | * | 2/1932 | Pflueger | A01K 87/04 43/24 |
| 1,993,342 A | * | 3/1935 | Gurrieri | A01K 87/04 43/24 |

(Continued)

FOREIGN PATENT DOCUMENTS

WO    WO 2007094105 A1 *  8/2007  ............ A01K 87/04

*Primary Examiner* — Gregory Binda
*Assistant Examiner* — Nahid Amiri
(74) *Attorney, Agent, or Firm* — NK Patent Law, PLLC

(57) ABSTRACT

A clamp assembly for maintaining two rod sections parallel to each other includes a collar encircling a longitudinal axis for receiving a first rod section, and a retainer attached to the collar. The retainer has a first hook and a second hook. The second hook for receiving a second rod section is attached to the collar and the first hook is connected to the second hook. The clamp assembly has an open configuration in which the retainer hinges from the collar, and a closed configuration in which the first hook at least partially surrounds the collar. The collar includes a band for encircling the first rod section. The band has a first circumferential end and an opposing second circumferential end that meet to form a closure.

19 Claims, 4 Drawing Sheets

(56) References Cited

U.S. PATENT DOCUMENTS

| | | | | |
|---|---|---|---|---|
| 2,306,112 A | * | 12/1942 | Touchstone | A01K 87/04 43/24 |
| 2,421,443 A | * | 6/1947 | Torresen | F16L 3/1233 174/40 CC |
| 2,502,846 A | * | 4/1950 | Hoffman | A01K 87/04 43/24 |
| 2,872,751 A | * | 2/1959 | Mayfield | A01K 87/04 43/24 |
| 3,354,517 A | * | 11/1967 | Levinsky | F16G 11/02 174/71 R |
| 3,389,046 A | * | 6/1968 | Burress | A01K 87/02 156/294 |
| 3,400,481 A | * | 9/1968 | Christenson | A01K 87/04 156/86 |
| 3,486,672 A | * | 12/1969 | Esopi | A63C 11/025 24/302 |
| 3,521,332 A | * | 7/1970 | Kramer | F16B 2/22 248/229.26 |
| 3,609,826 A | * | 10/1971 | Seabourn | B65D 63/02 24/279 |
| 3,613,287 A | * | 10/1971 | Grein | A01K 87/02 403/293 |
| 3,746,777 A | * | 7/1973 | Peek | H01R 4/186 174/71 R |
| 4,165,027 A | * | 8/1979 | Briggs | A63C 11/025 24/302 |
| 4,707,892 A | * | 11/1987 | Nelson | A01K 61/002 24/336 |
| 4,940,856 A | * | 7/1990 | Bock | H01R 4/186 174/84 C |
| 5,566,495 A | * | 10/1996 | Kim | A01K 97/10 248/538 |
| D402,396 S | * | 12/1998 | Protz, Jr. | A01K 87/02 D26/138 |
| 5,855,084 A | * | 1/1999 | Huddleston | A01K 87/007 43/17 |
| 6,021,597 A | * | 2/2000 | Lajoie | A01K 87/02 43/25 |
| 6,522,231 B2 | * | 2/2003 | Buswell | H01F 3/06 336/83 |
| 6,584,725 B1 | * | 7/2003 | Elam | A01K 97/08 43/21.2 |
| 6,691,382 B1 | * | 2/2004 | Su | B65D 7/20 24/335 |
| 6,942,532 B2 | * | 9/2005 | Snyder | B63B 35/7933 114/382 |
| 8,365,458 B2 | * | 2/2013 | Omura | A01K 87/04 43/24 |
| 8,801,322 B2 | * | 8/2014 | Shalaby | B62B 3/12 403/322.4 |
| 2003/0014899 A1 | * | 1/2003 | Kollodge | A01K 87/02 43/25 |

* cited by examiner

CLAMPING ASSEMBLY FOR SECTIONED FISHING ROD

TECHNICAL FIELD

The present disclosure relates to devices for managing fishing rods. More particularly, the present disclosure relates to devices for securing two sections of a break-down fishing rod together in a side-by-side arrangement.

BACKGROUND

Fishing rods are available in many varieties, most of which are now of the sectioned break-down type for convenience when transporting and storing the rods. A typical such rod has two sections, one of which is a base that carries a reel and the other of which is a more slender tip. The two sections are typically joined by male and female ferrules or fittings at corresponding ends of the sections. They are typically simply pressed together for use and separated by hand.

Fishing is an activity that can involve a considerable amount of gear even when practiced by a hobbyist. Rods are typically accompanied by tackle boxes and bait or lure supplies, not to mention food and beverages that may be brought on a fishing expedition of even just a few hours duration. Multiple vehicles, coolers, carts, bags and modes of portage may be involved as participants, gear, and supplies are transported from home, over land by automobile, and over water by boat. Sharing the love of fishing with younger generations is a core tradition, and as any parent knows, children require special patience and preparation. Thus, a fishing trip can represent quite an organizational challenge. Equipment can become disorganized, entangled in fishing lines, and even lost as rods and other items are transported and stored.

Sectioned break-down rods are of particular concern. Whether great expense has been applied to the purchase or sentimental value from fond memories is upon a rod, its loss or damage can cut short a fishing trip or disappoint a participant if too few rods or a favored rod is not available. A sectioned rod is not typically unstrung for any given outing or transport mode. The fishing line from the reel is typically left strung through the guides of the rod. If the sections of the rod are separated, it is likely that the fishing line will get tangled up with other rods and gear items. Thus a break-down rod, among all the gear items that also must be managed, deserves special attention.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a clamp assembly for maintaining two rod sections parallel to each other includes a collar encircling a longitudinal axis for receiving a first rod section, and a retainer attached to the collar. The retainer has a first hook and a second hook. The second hook, which is for receiving a second rod section, is attached to the collar. The first hook is connected to the second hook. The clamp assembly has an open configuration in which the retainer hinges from the collar, and a closed configuration in which the first hook at least partially surrounds the collar.

In at least one example, the collar includes a band for encircling the first rod section. The band has a first circumferential end, and an opposing second circumferential end. A first cylinder is connected to the first circumferential end. A second cylinder is connected to the second circumferential end longitudinally offset from the first cylinder. A pin may be received within the first and second cylinder parallel to the longitudinal axis. A third cylinder may be connected to the first circumferential end of the band longitudinally separated from the first cylinder, the second cylinder longitudinally positioned between the first cylinder and third cylinder.

In at least one example, the collar includes a band for encircling the first rod section. The band has a first circumferential end and an opposing second circumferential end that meet to form a closure. A first cylindrically rolled tab extending from the first circumferential end; and a second cylindrically rolled tab extending from the second circumferential end longitudinally offset from the first cylindrically rolled tab.

A third cylindrically rolled tab may extend from the first circumferential end of the band longitudinally separated from the first cylindrically rolled tab, the second cylindrically rolled tab longitudinally positioned between the first cylindrically rolled tab and third cylindrically rolled tab. A tubular pin may be received by the first, second, and third cylindrically rolled tabs, the tubular pin having an internal longitudinal bore that defines a hinging axis about which the retainer hinges in the open configuration of the clamp assembly.

In at least one example, the retainer includes two halves each having a first hook and a second hook. In each half of the retainer, the second hook is attached to the collar and the first hook is connected to the second hook by a curved bridge. The first hook and second hook of one half of the retainer are in a first plane, and the first hook and second hook of the other half of the retainer are in a second plane parallel to the first plane.

The two halves of the retainer are connected to each other by a connector that is parallel to the longitudinal axis. The retainer may be formed from a single piece of material having two terminal ends, each of which is parallel to the longitudinal axis.

The retainer in at least one example hinges by the two terminal ends around a hinging axis along the two terminal ends in the open configuration of the clamp assembly.

In at least one example, the collar includes a band for encircling the first rod section, the band having a first circumferential end and an opposing second circumferential end. Two longitudinally separated cylinders are connected to the first circumferential end. A central cylinder is connected to the second circumferential end and positioned between the separated cylinders. The terminal ends of the retainer are received within the separated cylinders in at least one example.

In at least one example, a pin that is parallel to the longitudinal axis is received within the first cylinder, second cylinder, and third cylinder, and has an internal bore that receives the terminal ends of the retainer.

In at least one example, the first cylinder, second cylinder, and third cylinder are each formed as a respective cylindrically rolled tab extending circumferentially from the band of the collar.

In at least one embodiment, the retainer is formed from spring steel.

In at least one example, a respective bushing is carried by each of the collar and the retainer.

In at least one embodiment, a clamp assembly includes a collar at least partially encircling a longitudinal axis, and a retainer having a first hook hingedly attached to the collar and a second hook connected to the first hook. The clamp assembly has an open configuration in which the retainer hinges from the collar, and a closed configuration in which the first hook is snapped into engagement with the collar at least partially surrounding the collar.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Figure 1:
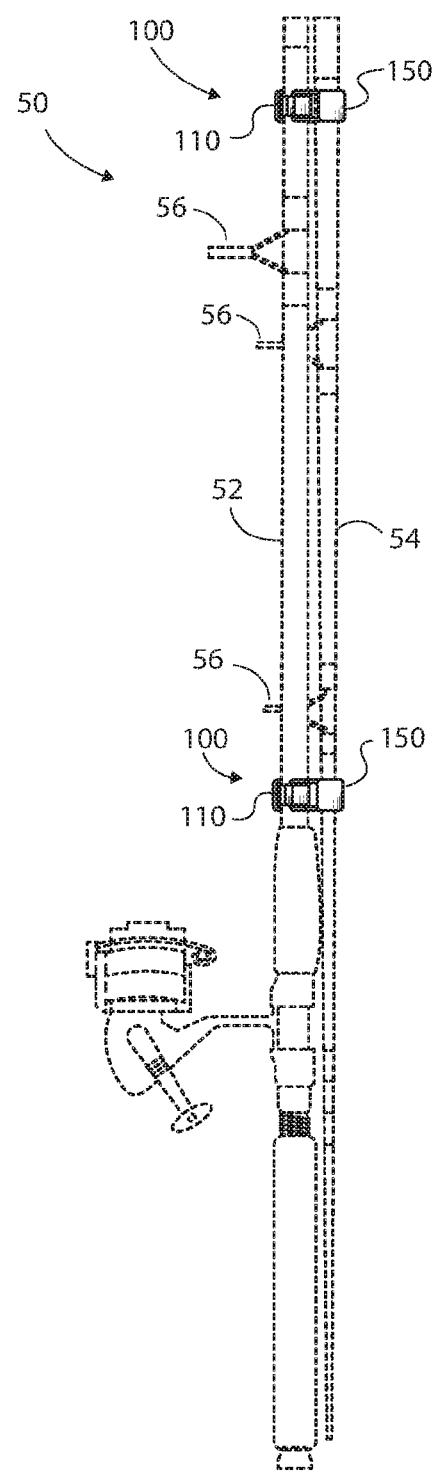
FIG. 1 shows clamp assemblies according to at least one embodiment securing two sections of a break-down fishing rod in a side-by-side arrangement.

FIG. 1 shows a break-down fishing rod 50 having a first section 52 and second section 54 advantageously secured together in a side-by-side overlapping arrangement by multiple clamp assemblies 100, each according to at least one embodiment of the invention. In FIG. 1, the first section 52 is illustrated as the handled end of the fishing rod, conventionally called the base, and the second section 54 is illustrated as the free or casting end of the fishing rod, typically called the tip. Fishing line guides 56 are installed on the first and second sections in FIG. 1. The below descriptions relate to FIG. 1 and other arrangements as well. Various types of sectioned rods are within the scope of these descriptions whether or not such rods particularly resemble that shown in FIG. 1. Furthermore, references below to the first and second sections of a break-down rod can relate to the base and tip of such a rod irrespective of order.

Figure 2:
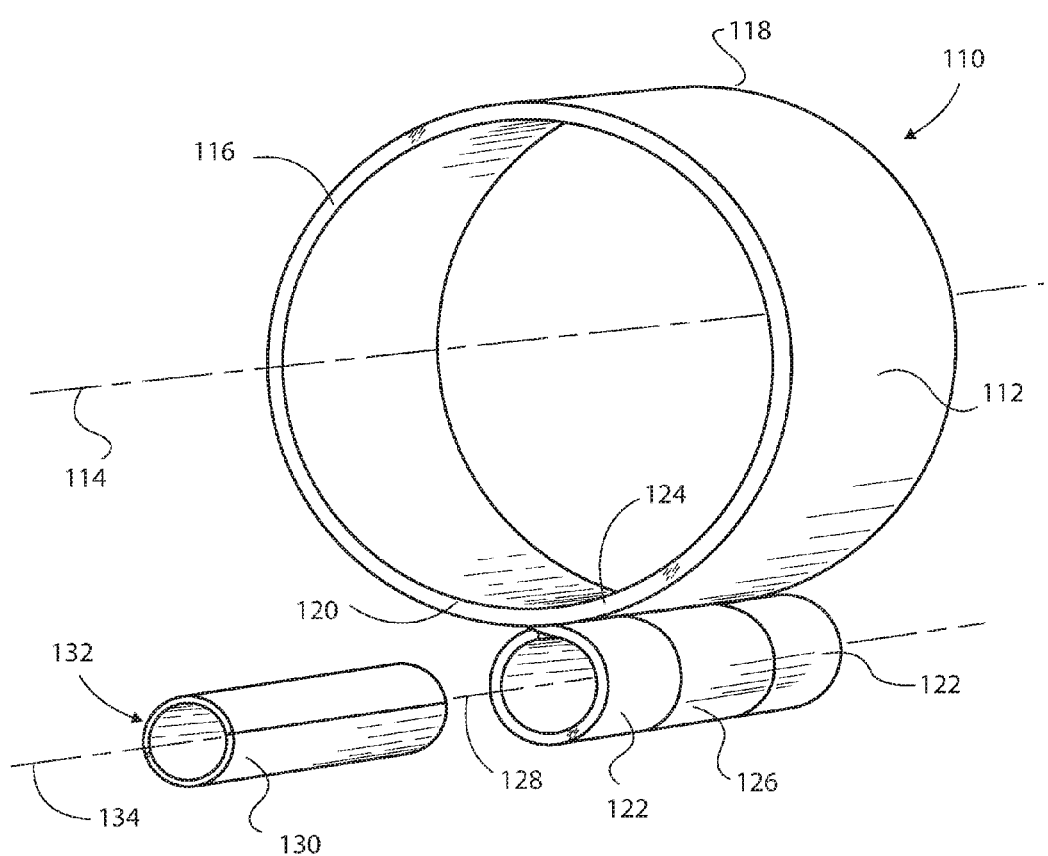
FIG. 2 shows a collar and pin of a clamp assembly of FIG. 1.
Figure 3:
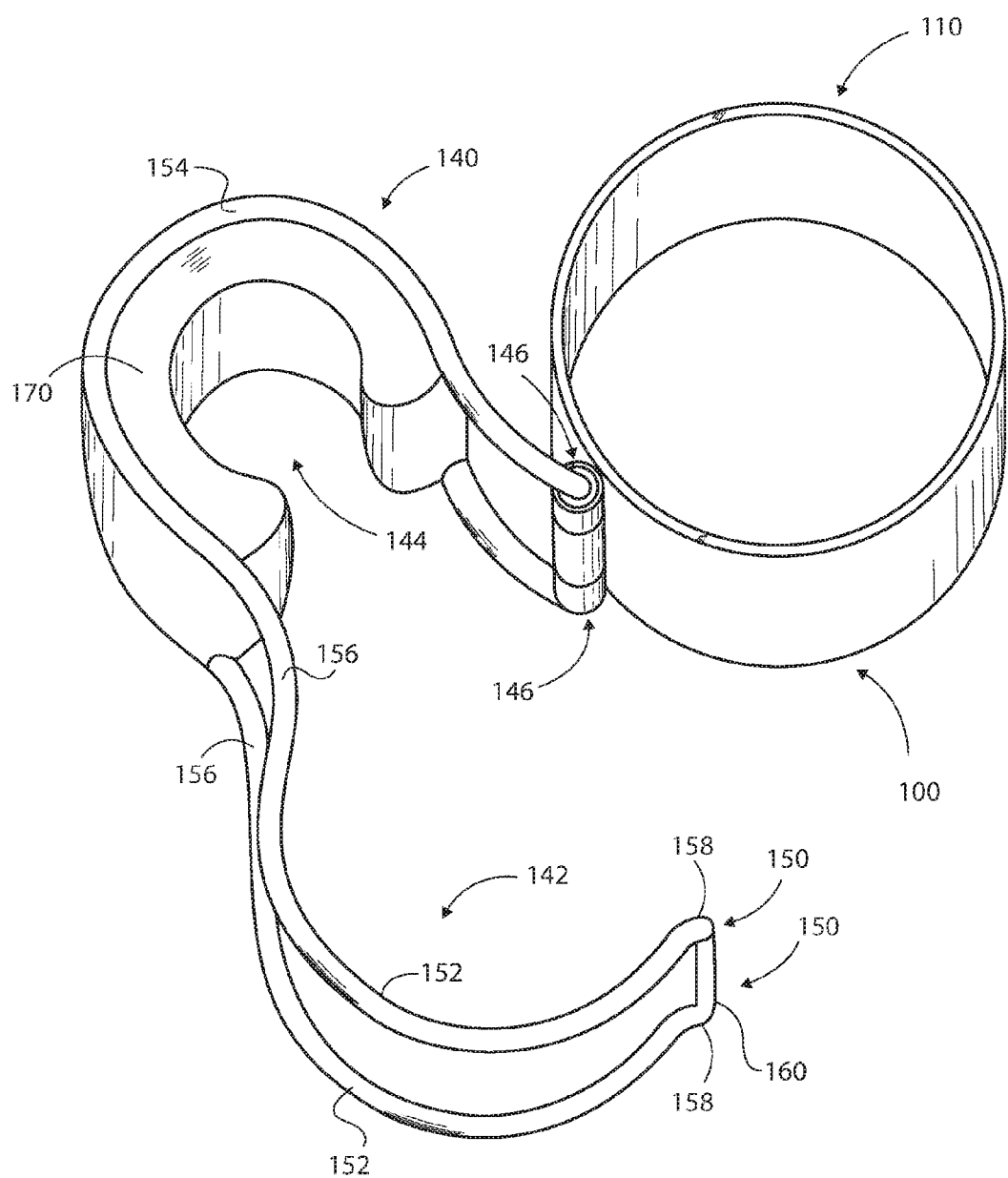
FIG. 3 shows a clamp assembly of FIG. 1 in an open configuration in which a retainer hinges from the collar.
Figure 4:
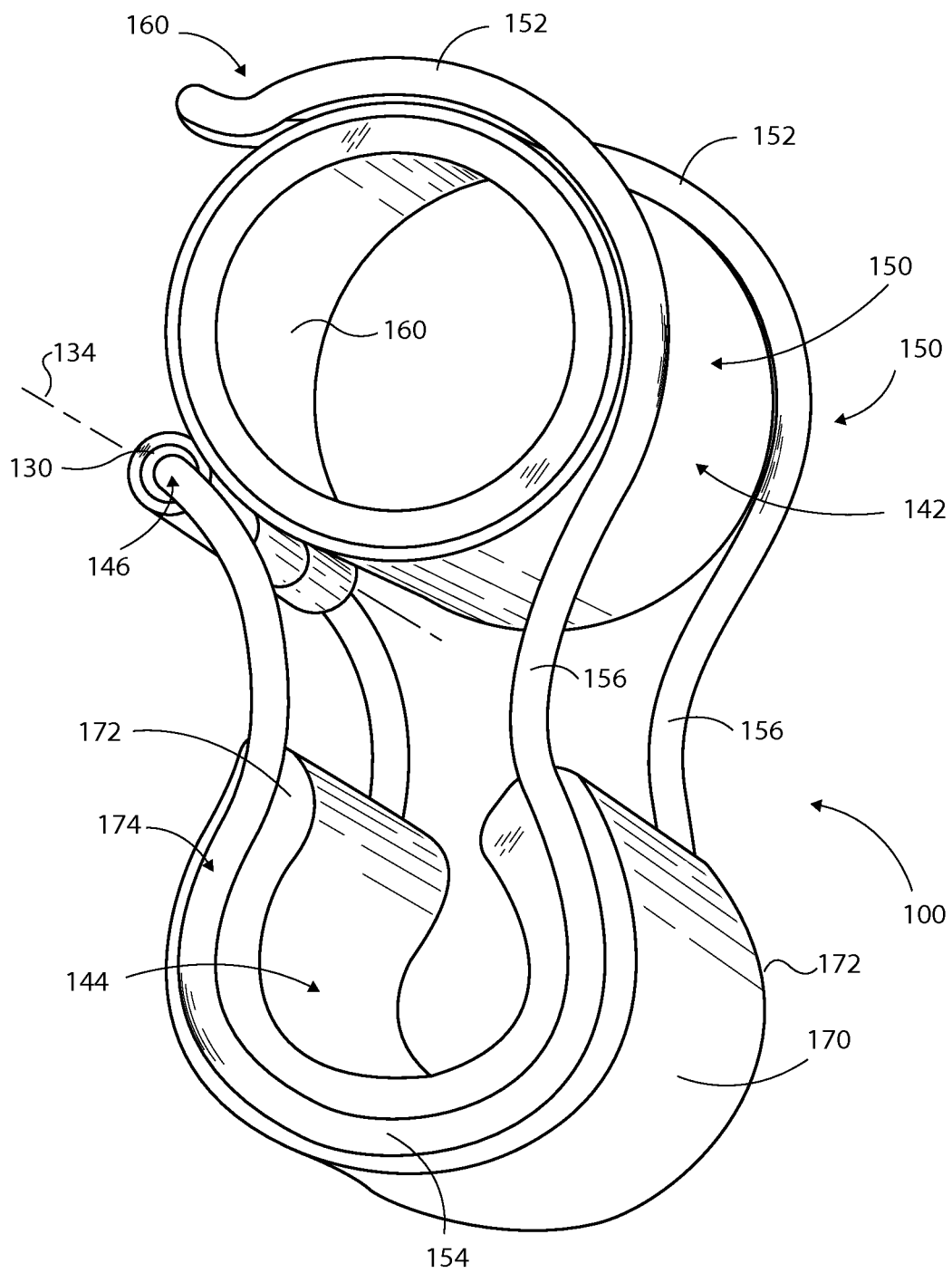
FIG. 4 shows the clamp assembly of FIG. 4 in a closed configuration in which the retainer is snapped into engagement with the collar.

Each clamp assembly, as shown in FIGS. 2-4, includes a collar 110 for securing to a section of a breakdown rod and a retainer 140, which hinges from the collar 110. The retainer 140 swings open to receive another section of the rod, and then snaps partially around the collar 110 to close the clamp assembly. FIG. 3 illustrates an open configuration of the clamp assembly in which the retainer is swung from the collar in preparation for receiving a rod portion. FIG. 4 illustrates the closed configuration of the clamp assembly in which the retainer 140 is snapped into engagement with the collar. Once snapped as shown in FIG. 4, the two sections 52 and 54 of a break down rod 50 are held together in a parallel overlapping compact arrangement as shown in FIG. 1 for convenience when transporting or storing the break-down rod.

In the illustrated embodiment, the collar 110 is formed from a single piece of material having a circumferential band 112 with tabs extending circumferentially from its circumferential ends. The band 112 is shaped as a generally circular cylinder having an internal longitudinal axis 114. The band 112 receives and encircles a rod section 52 or 54 (FIG. 1) parallel to the longitudinal axis 114 when the collar 110 is mounted as shown in FIG. 1. A first circumferential end 120 and a second end 124 of the band 120 essentially meet to define a line a closure that is generally parallel with the longitudinal axis of the collar. Interdigitated tabs extend integrally from the circumferential ends of the band to maintain the closure of the collar 110 around a rod section. In the illustrated embodiment, separated tabs extend with slight circumferential extension from a first end 120 of the band toward the second end 124, and then roll outward to form separated cylindrical rolls 122 to receive a tubular pin 130. A central tab extends oppositely from the second end 124 of the band, and then rolls outward in a direction opposite the roll direction of the separated tabs to form a central cylindrical roll 126 to receive the pin 130. When the band 112 is closed around a rod section to form the collar 110, the central roll 126 is positioned between the separated rolls 122 in interdigitated fashion, and the central and separated rolls align to receive the pin 130 and thus secure the collar 110 on a rod section.

As shown in FIG. 2, the collar assumes a figure-8 form upon closure. The generally circular cylinder formed by the band 112 may have a taper from a first longitudinal end 116 to a second longitudinal end 118 to match a tapered rod as is the case in many typical fishing rods.

The tubular pin 130 has an internal bore 132 that defines a hinging axis 134 for the retainer 140 as shown in FIG. 4. The hinging axis 134 is parallel to the longitudinal axis 114 (FIG. 2) of the collar 110, and thus is parallel to any rod section within the collar. In the embodiment shown in FIG. 2, the tubular pin 130 is formed as a roll pin from a single piece of material. The tubular pin 130 in other embodiments may be a tube or pipe piece that is extruded, molded, or machined. The tubular pin 130 may be sized to define an interference fit or press fit into the cylindrical rolls 122 and 126 to maintain closure of the band 112.

The retainer 140 has a first cage portion 142 (FIG. 3) for snapping around the collar 110 (FIG. 4) and a second cage portion 144 for receiving an additional rod section. That is, in use as shown in FIG. 1, the first cage portion 142 of the retainer snaps partially around the collar 110, which is secured to a first section of the break-down rod, and the second cage portion 144 retains the second section of the break-down rod. Thus the first and second sections of the break down rod are secured together in a side-by-side overlapping arrangement.

In the illustrated embodiment, the retainer 140 is formed from a single piece of wire or rod like material, with bends made to form the first and second cage portions 142 and 144. In the illustrated embodiment, the retainer 140 is formed from a single piece of material having terminal ends 146 that are received in the internal bore 132 of the tubular pin 130. The retainer 140 is sufficiently rigid and resilient such that, once assembled with the collar 110 and pin 130 as shown in FIGS. 3 and 4, the retainer 140 hinges about its terminal ends and the hinging axis 134 with the terminal ends 146 of the retainer trapped within the pin 130.

The retainer in the illustrated embodiment includes two halves 150 each having a first hook 152 and second hook 154 that are joined by a curved bridge 156. The two retainer halves are joined by a connector 160 that extends between the two retainer halves 150 at the ends of the second hooks 152. The connector 160 extends parallel to the hinging axis 134 (FIGS. 2, 4). For each half 150 of the retainer 140, the first hook 152 and second hook 154 lie in a plane that is perpendicular to the hinging axis 134. As such, the plane of each retainer half 150 is parallel to the other. The two retainer halves 150 have mirror image symmetry about a plane through the midpoint of the connector 160. The two first hooks 152 partially hook around a first hook axis that is parallel to the hinging axis. The two second hooks partially hook around a second hook axis that is parallel to the hinging axis 134 and spaced from the first hook axis. Thus, the first hook axis and second hook axis are parallel to the longitudinal axis 114 of the collar 110 and parallel to any rod section within the collar. The two first hooks 152 define the first cage 142 for snapping partially around the collar 110 and the two second hooks 154 define the second cage 144 for receiving and retaining the second section 54 of a break-down rod 50 as shown in FIG. 1. The second cage portion 144 is defined from the hinging axis 134 to the curved bridges 156, and the first cage portion 142 is defined from the curved bridges 156 to the connector 160.

Assembling the arrangement in FIG. 1 might proceed by first installing the collar 110 on the first section 52 of the fishing rod 50. To do this the collar 110 (FIG. 2) without the pin 130 can be opened by flexing the band 112 and displacing the central roll 126 from between the separated rolls 122. With the first section 52 received within the band 112, the collar 110 can then be closed around the rod section, aligning the central roll 126 between the separated rolls 122. The pin 130 can then be inserted into the rolls to maintain closure of the collar. Then the terminal ends 146 of the retainer 140 can be inserted into the pin 130. Installation upon a rod section that does not have guides 56 (FIG. 1) may be even simpler. The distal end of the rod section can simply be received within the collar 110 with the clamp assembly 100 already essentially assembled without the need to open the collar. In either case, once the clamp assembly 100 is assembled as shown in FIG. 3, the pin 130 maintains closure of the collar 110, the retainer 140 traps the pin 130 within the aligned central roll 126 and separated rolls 122, and the connector 160 maintains the retainer in engagement with the pin 130. The retainer 140 hinges about the hinging axis 134 defined by the tubular pin but the terminal ends 146 of the retainer 140 are trapped within the pin 130 by the connector 160, which maintains the two retainer halves 150 at a spacing at which the pin 130 and separated rolls 122 fit, but from which the terminal ends 146 of the retainer 140 cannot escape the pin 130 without intentional and forceful flexing of the retainer.

In the illustrated embodiment, the pin 130 maintains closure of the collar 110 and serves as a bushing when the retainer is pivoted around the hinging axis 134. In other embodiments, however, the terminal ends 146 of the retainer 140 maintain closure of the collar 110 without a pin being present. In such embodiments, the terminal ends 146 are received directly along a hinging axis 128 defined by the rolls 122 and 124 that are aligned upon closure of the collar.

The collar 110, retainer 140, and tubular pin 130 in at least one example are formed from spring steel, which is resilient and durable, capable of many moderate deformations and returns to original shape. It is expected that the retainer particularly will undergo many flexes and shape returns over the service life of the clamp assembly 100. Each time the clamp assembly 100 is transitioned between its closed configuration (FIG. 4) and open configuration (FIG. 3), the retainer 140 is expected to flex slightly and then return toward its original shape. This assures a tight state, particularly in the closed configuration, so that the first cage 142 retains the collar as shown in FIG. 4 in order to tightly retain a section of the rod within the second cage 144. The retainer 140 is also expected to undergo flexing and shape return whenever the collar 110 is opened to be installed or removed from a rod, which will likely occur less often. A typical user may prefer to install the collar 110 upon a section of a break-down rod for long-term use without frequent removal of the collar from the rod.

When the closed configuration of the clamp assembly is achieved, with the collar 110 surrounding the first section 52 of a rod and the retainer clasping the second section 54 of the rod approximately parallel to the first section as shown in FIG. 1, the first hook axis is approximately coincident with the longitudinal axis of the first section of the rod, and the second hook axis is approximately coincident with the longitudinal axis of the second section of the rod.

Advantageously, the first hooks 152 have turned out ends 158 at their junctions with the connector 160. The connector 160 represents the first point of contact with the collar 110 with each closure of the clamping assembly. By defining a beveled opening of the first cage 142, the turned out ends 158 encourage the retainer to flex open as the collar 110 enters the first cage 142 before snapping upon the collar at full closure.

It is generally expected that two clamping assemblies 100 may be used to secure together two sections of a break-down rod. For example, two clamping assemblies 100 may be mounted by their collars 110 to the base section 52 of a break down rod 50 as shown in FIG. 1. Other arrangements are within the scope of these descriptions. For example, clamping assemblies may be mounted by their collars to the tip of a break down rod. Furthermore, a first clamping assembly may be mounted to the tip of a break down rod and a second clamping assembly may be mounted to the base.

In a further embodiment of a clamping assembly, a collar has longitudinally extending base tabs at opposing longitudinal ends. Such longitudinally extending base tabs facilitate essentially permanent attachment of the collar to a rod when windings are wrapped around rod and base tabs somewhat like the windings by which string guides are conventionally attached to rods. The windings can be coated with epoxy or other material to form a semi-permanent wound composite.

Each collar may be custom formed to fit the diameter and/or taper of a commercially available rod. For example, the collar of a first clamping assembly may be formed to fit the diameter and/or taper of a first portion of the base of a rod and a second clamping assembly may be formed to fit the diameter of a second portion of the base spaced from the first portion. Such an arrangement is indeed particularly within the scope of the representation in FIG. 1. Other arrangements are within the scope of these descriptions and the drawings.

FIG. 4 illustrates a circumferential collar bushing 160 placed within the collar to provide a secure fit upon a rod. The collar bushing 160 resides between the collar 110 and any rod portion received by the collar, preventing direct contact between the collar and rod. Various bushings having various thicknesses may be made available so that a collar of a particular size can be used with rods having various diameters. The bushing may be formed for example from a strip that is rolled around a rod at the desired location and secured by an adhesive material. Alternatively, or additionally, the bushing can be adhered to the interior of the collar by an adhesive material. In one embodiment, multiple strips, each having a particular thickness, are made available to assure that a collar can be mounted upon a variety of rods. The collar bushing may be formed of a deformable, resilient, and gripping materials including, but not limited to, rubber, silicone and other synthetic compounds, polymers, foam, and cork. It may be particularly advantageous to use malleable or pliable material for the bushing so as to cushion and limit or prevent damage the rod portion it surrounds.

FIGS. 3-4 also illustrate a retainer bushing 170 carried by the second cage of the retainer 140, trapped between the second hook portions of the two retainer halves. The retainer bushing 170 resides between the second hooks 154 of the retainer and any rod portion received by the second hooks, preventing direct contact between the retainer and rod. The retainer bushing 170 has an opening to permit a rod to pass by the curved bridges 156 to enter the second cage 144. The retainer bushing serves to grip, cushion, and limit or prevent damage to the rod portion it partially surrounds. In the illustrated embodiment, the retainer bushing 170 has an approximate C-shape configuration that curls partially around the second hook axis. In each of two opposing longitudinal ends 172 of the retainer bushing 170, a C-shaped channel 174 is formed to receive a second hook portion 154 of the retainer 140, further trapping the retainer bushing 170 within the retainer. The retainer bushing 170 may be formed of a deformable, resilient, and gripping materials including, but not limited to, rubber, silicone and other synthetic compounds, polymers, foam, and cork. It may be particularly advantageous to use resilient but malleable or pliable material for the retainer bushing so as to cushion and limit or prevent damage the rod portion it partially surrounds.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A clamp assembly for maintaining two rod sections parallel to each other, the clamp assembly comprising:
    a collar encircling a longitudinal axis for receiving a first rod section; and
    a retainer for receiving a second rod section, the retainer comprising two halves, each half of the retainer comprising a first hook and a second hook, the second hook attached to the collar, the first hook connected to the second hook by a curved bridge,
    wherein the first hook and second hook of one half of the retainer are in a first plane, and the first hook and second hook of the other half of the retainer are in a second plane parallel to the first plane,
    wherein the clamp assembly has an open configuration in which the retainer hinges from the collar, and a closed configuration in which each said first hook at least partially surrounds the collar.

2. The clamp assembly according to claim 1, wherein the collar comprises:
    a band for encircling the first rod section, the band having a first circumferential end and an opposing second circumferential end;
    a first cylinder connected to the first circumferential end; and
    a second cylinder connected to the second circumferential end longitudinally offset from the first cylinder.

3. The clamp assembly according to claim 2, further comprising a pin received within the first and second cylinder parallel to the longitudinal axis.

4. The clamp assembly according to claim 2, further comprising a third cylinder connected to the first circumferential end of the band longitudinally separated from the first cylinder, the second cylinder longitudinally positioned between the first cylinder and third cylinder.

5. The clamp assembly according to claim 1, wherein the collar comprises:
    a band for encircling the first rod section, the band having a first circumferential end and an opposing second circumferential end that meet to form closure of the band,
    a first cylindrically rolled tab extending from the first circumferential end; and
    a second cylindrically rolled tab extending from the second circumferential end longitudinally offset from the first cylindrically rolled tab.

6. The clamp assembly according to claim 5, further comprising a third cylindrically rolled tab extending from the first circumferential end of the band longitudinally separated from the first cylindrically rolled tab, the second cylindrically rolled tab longitudinally positioned between the first cylindrically rolled tab and third cylindrically rolled tab.

7. The clamp assembly according to claim 6, further comprising a tubular pin received by the first, second, and third cylindrically rolled tabs, the tubular pin having an internal longitudinal bore that defines a hinging axis about which the retainer hinges in the open configuration of the clamp assembly.

8. The clamp assembly according to claim 1, wherein the two halves of the retainer are connected to each other by a connector that is parallel to the longitudinal axis.

9. The clamp assembly according to claim 8, wherein the retainer is formed from a single piece of material having two terminal ends, each of which is parallel to the longitudinal axis.

10. The clamp assembly according to claim 9, wherein the retainer hinges by the two terminal ends around a hinging axis along the two terminal ends in the open configuration of the clamp assembly.

11. The clamp assembly according to claim 10, wherein the collar comprises:
    a band for encircling the first rod section, the band having a first circumferential end and an opposing second circumferential end;
    two longitudinally separated cylinders connected to the first circumferential end; and
    a central cylinder connected to the second circumferential end and positioned between the separated cylinders.

12. The clamp assembly according to claim 11, wherein the terminal ends of the retainer are received within the separated cylinders.

13. The clamp assembly according to claim 12, further comprising a pin that is: parallel to the longitudinal axis; received within the first cylinder, second cylinder, and third cylinder; and has an internal bore that receives the terminal ends of the retainer.

14. The clamp assembly according to claim 13, wherein each of the first cylinder, second cylinder, and third cylinder comprises a respective cylindrically rolled tab extending from the band of the collar.

15. The clamp assembly according to claim 1, wherein the retainer comprises spring steel.

16. The clamp assembly according to claim 1, further comprising a bushing carried by the collar or by the retainer.

17. A clamp assembly comprising:
 a collar at least partially encircling a longitudinal axis; and
 a retainer for receiving a second rod section, the retainer comprising two halves, each half of the retainer comprising a first hook and a second hook, the second hook hingedly attached to the collar, the first hook connected to the second hook by a curved bridge,
 wherein the first hook and second hook of one half of the retainer are in a first plane, and the first hook and second hook of the other half of the retainer are in a second plane parallel to the first plane, and
 wherein the clamp assembly has an open configuration in which the retainer hinges from the collar, and a closed configuration in which each said first hook is snapped into engagement with the collar at least partially surrounding the collar.

18. The clamp assembly according to claim 17, wherein the collar comprises:
 a band at least partially encircling the longitudinal axis, the band having a first circumferential end and an opposing second circumferential end;
 two longitudinally separated cylinders connected to the first circumferential end; and
 a central cylinder connected to the second circumferential end and positioned between the separated cylinders.

19. The clamp assembly according to claim 17, further comprising a bushing carried by the collar or by the retainer.

* * * * *